(12) United States Patent
Fushiki et al.

(10) Patent No.: US 9,010,281 B2
(45) Date of Patent: Apr. 21, 2015

(54) HOT WATER SUPPLY SYSTEM

(75) Inventors: Takayuki Fushiki, Shizuoka (JP);
Hidekatsu Fujita, Shizuoka (JP)

(73) Assignee: Hitachi Appliances, Inc., Tokyo (JP)

( * ) Notice: Subject to any disclaimer, the term of this patent is extended or adjusted under 35 U.S.C. 154(b) by 333 days.

(21) Appl. No.: 13/516,242

(22) PCT Filed: Dec. 15, 2010

(86) PCT No.: PCT/JP2010/072525
§ 371 (c)(1),
(2), (4) Date: Jun. 15, 2012

(87) PCT Pub. No.: WO2011/074596
PCT Pub. Date: Jun. 23, 2011

(65) Prior Publication Data
US 2012/0255507 A1    Oct. 11, 2012

(30) Foreign Application Priority Data
Dec. 15, 2009    (JP) ................. 2009-283573

(51) Int. Cl.
F22D 5/00 (2006.01)
F24H 1/00 (2006.01)
F24D 17/00 (2006.01)
F24D 17/02 (2006.01)
(Continued)

(52) U.S. Cl.
CPC .......... F24H 1/0081 (2013.01); F24D 17/0078 (2013.01); F24D 17/02 (2013.01); F24D 19/1051 (2013.01); F24D 2200/12 (2013.01); F24D 2220/08 (2013.01); F24D 2240/26 (2013.01); F24H 4/04 (2013.01); Y02B 30/12 (2013.01); Y02B 30/123 (2013.01)

(58) Field of Classification Search
CPC ....................................................... F24D 3/08
USPC ............ 122/20 R, 19.1, 406.1, 448.1, 448.2; 137/337, 340, 563, 564
See application file for complete search history.

(56) References Cited

U.S. PATENT DOCUMENTS 5,564,462 A * 10/1996 Storch ........................... 137/337
6,453,938 B1 * 9/2002 Ebster ........................... 137/337
(Continued)

FOREIGN PATENT DOCUMENTS

JP    55-137448    10/1980
JP    2006-329581    12/2006
(Continued)

*Primary Examiner* — Gregory A Wilson
(74) *Attorney, Agent, or Firm* — Baker Botts L.L.P.

(57) ABSTRACT

Disclosed is a hot water supply system provided with a tank which holds a high-temperature liquid, and a heating means for generating the high-temperature liquid which is stored in the aforementioned tank. In the lower portion of the aforementioned tank is provided a water-heating heat exchanger which heats the water to be supplied to a hot water terminal by means of the liquid present in the lower portion of the aforementioned tank. Further, a hot water supply circuit is provided which conducts water to the aforementioned hot water supply terminal. The aforementioned hot water supply circuit splits into a water-heating path passing through the aforementioned water-heating heat exchanger, and a bypass path bypassing the aforementioned water-heating heat exchanger, and is provided with a hot water supply circuit control mechanism which controls the circulation state of the water in the aforementioned water-heating path and the aforementioned bypass path.

8 Claims, 7 Drawing Sheets

(51) Int. Cl.
*F24D 19/10* (2006.01)
*F24H 4/04* (2006.01)

(56) References Cited

U.S. PATENT DOCUMENTS

| | | | | |
|---|---|---|---|---|
| 8,567,689 | B2* | 10/2013 | Eisenhower et al. | 237/8 A |
| 2002/0139420 | A1* | 10/2002 | Ebster | 137/563 |
| 2005/0111991 | A1* | 5/2005 | Chida et al. | 417/207 |
| 2006/0283404 | A1* | 12/2006 | Wen-Lung | 122/20 R |
| 2011/0259560 | A1* | 10/2011 | Kinoshita | 165/138 |
| 2011/0289950 | A1* | 12/2011 | Kim et al. | 62/160 |
| 2011/0315091 | A1* | 12/2011 | Adachi et al. | 122/14.1 |
| 2013/0306301 | A1* | 11/2013 | Tamaki et al. | 165/287 |

FOREIGN PATENT DOCUMENTS

| | | |
|---|---|---|
| JP | 2007-225252 | 9/2007 |
| JP | 2008-45851 | 2/2008 |
| JP | 2008-241170 | 10/2008 |

* cited by examiner

HOT WATER SUPPLY SYSTEM

TECHNICAL FIELD

The present invention relates to a tank-type hot water supply system.

BACKGROUND ART

Conventionally, a tank-type hot water supply system is provided with a heating means (for example, a heat pump circuit, or an electric heater) for heating water, and a tank for storing warm water heated by a heat source (for example, see Patent Literature 1 and 2).

PRIOR ART REFERENCE

Patent Literature

Patent Literature 1: JP 2006-329581 A
Patent Literature 2: JP 2008-045851 A

SUMMARY OF THE INVENTION

Problems to be Solved by the Invention

In the aforementioned conventional hot water supply system, it generally takes a long time to obtain a high-temperature water. Accordingly, there is a demand for saving the high-temperature water as much as possible without using it up.

By the way, when the high-temperature water in the tank is used for hot water supply or radiates heat, the temperature of a warm water in the tank is not lowered uniformly, but the high-temperature water still exists at an upper portion of the tank and the warm water whose temperature is lower than that of the high-temperature water exists at a portion lower than the upper portion of the tank.

Accordingly, in order to save the high-temperature water, it is preferable to use the warm water which exists at the portion lower than the upper portion of the high-temperature water so that the decrement of the high-temperature water is reduced as much as possible.

In addition to the conventional hot water supply system in which the high-temperature water is directly supplied, a hot water supply system in which a high-temperature liquid stored in a tank is used for hot water supplying, such as a hot water supply system in which a high-temperature water is indirectly used as a heating medium for heating water, and a hot water supply system in which a brine, etc. (not the high-temperature water) is used as the heating medium for heating water, may cause such a problem.

For this reason, an object of the present invention is to provide a hot water supply system which can effectively reduce the consumption of the high-temperature liquid in the tank.

Means for Solving the Problem

According to the present invention, a hot water supply system, comprising: a tank for storing a high-temperature liquid; and a heating means for heating the liquid stored in the tank to high-temperature, wherein a heat exchanger for heating water supplied to a hot water supply terminal by the liquid present at a lower portion in the tank is provided at the lower portion in the tank.

Effect of the Invention

According to the present invention, a hot water supply system which can effectively reduce the consumption of the high-temperature liquid in the tank can be provided.

EMBODIMENTS FOR CARRYING OUT THE INVENTION

Figure 1:
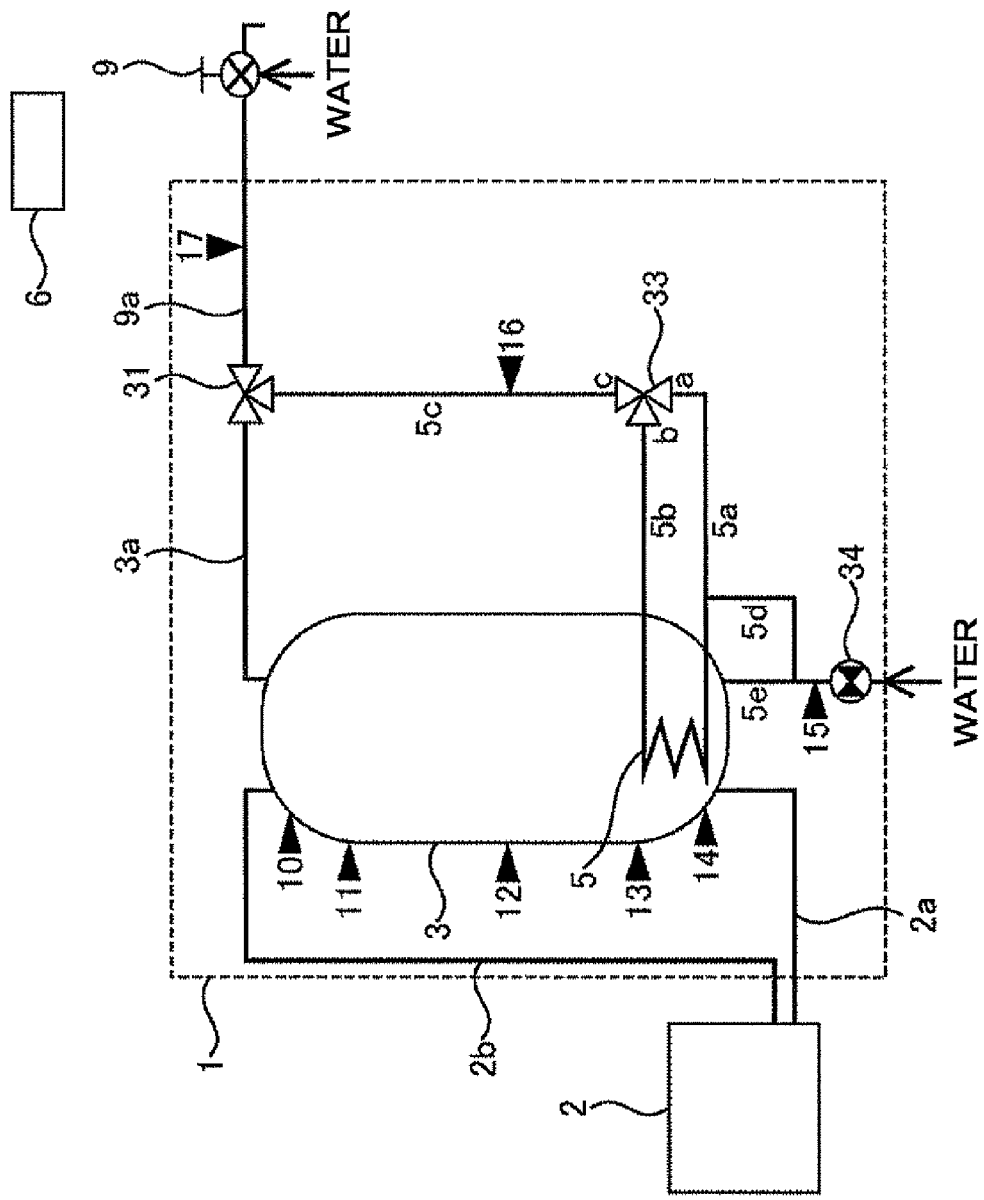
FIG. 1 is a schematic diagram of a hot water supply system according to a first embodiment of the present invention.

Hereinafter, embodiments of the present invention will be explained.

A hot water supply system according to this embodiment comprises: a tank for storing a high-temperature liquid; and a heating means for heating the liquid stored in the tank to high-temperature, wherein a heat exchanger for heating water supplied to a hot water supply terminal by the liquid present at a lower portion in the tank is provided at the lower portion in the tank.

According to the above configuration, the consumption of the high-temperature liquid in the tank can be reduced effectively using the heat of the liquid present at the lower portion in the tank for hot water supplying.

Accordingly, conventional problems of the tank having a large capacity for providing a sufficient capacity, and of the water boiled during the daytime at which the electricity charge is high can be solved or reduced.

For example, when a temperature of the liquid present at the lower portion in the tank, it is usually difficult to use the liquid. However, according to the above configuration, such a low-temperature liquid can be used for pre-heating water. Accordingly, the consumption of the high-temperature liquid can be reduced by the amount corresponding to the heat absorbed from the low-temperature liquid.

Also, in a heat pump hot water supply system, since an energy efficiency becomes higher as a temperature of a liquid to be boiled becomes lower, the energy efficiency can be improved by the above configuration. That is, by making the water absorb the thermal energy of the low-temperature liquid and by using the thermal energy for pre-heating, the temperature of the liquid to be boiled is lowered and the energy efficiency is improved while the loss of the thermal energy is lowered.

In addition, the hot water supply terminal includes common hot water supply terminals such as a hot water tap and a shower, and a bathtub hot water supply terminal for directly supplying hot water to a bathtub in order to fill the bathtub with the hot water. Also, a hot water supply circuit for leading water to the hot water supply terminal includes a common hot water supply circuit for leading water to the common hot water supply terminal, and a bathtub hot water supply circuit for directly supplying hot water to the bathtub in order to fill the bathtub with the hot water.

Also, the hot water supply circuit for leading the water to the hot water supply terminal is preferably provided. The hot water supply circuit branches to a water heating path which passes through the water heating heat exchanger and a bypass path which bypasses the water heating heat exchanger, and a hot water supply circuit control mechanism which controls a circulating condition of the water supplied to the water heating path and the bypass path is preferably provided.

In particular, the hot water supply circuit control mechanism is preferably configured to switch between a condition in which the water flows through the water heating path and a condition in which the water flows through the bypass path. Also, the hot water supply circuit control mechanism may be configured to adjust a flow rate ratio of the water flowing through the water heating path to the water flowing through the bypass path.

According to the above configuration, at the time of the hot water supplying, if necessary, it is possible to control whether the heat of the liquid at the lower portion in the tank is used or not, or a heat quantity to be used.

In particular, a temperature sensor for detecting a temperature of the liquid in the vicinity of the water heating heat exchanger is preferably provided so that the hot water supply circuit control mechanism controls the hot water supply circuit based on the temperature of the liquid in the vicinity of the water heating heat exchanger.

<First Embodiment>

Next, a first embodiment of the hot water supply system of the present invention will be explained.

Generally, as shown in FIG. 1, the hot water supply system of the first embodiment is provided with a storage tank unit 1 having a storage tank 3 for storing hot and cold water, and a heat pump unit 2 which serves as a heating means for heating the hot and cold water in the storage tank 3.

The storage tank unit 1 is provided with the storage tank 3, tank temperature sensors 10, 11, 12, 13, 14 for detecting temperatures in the storage tank 3, and a heat pump supply pipe 2a and a heat pump return pipe 2b (a circulation circuit) to and from the heat pump unit 2.

The heat pump unit 2 is provided with a heat pump cycle composed of a compressor, a condenser, an expansion valve, an evaporator, and a hot and cold water circulating pump (not shown), etc.

The hot and cold water at the lower portion in the storage tank 3 is fed from the heat pump supply pipe 2a to the heat pump unit 2 so as to be boiled. Next, the high-temperature water is returned from the heat pump return pipe 2b to an upper portion in the storage tank 3 so as to be stored.

The storage tank unit 1 is provided with a water pipe 5e for leading water to the storage tank 3, a hot water supply pipe 3a for feeding high-temperature hot water from the storage tank 3, a branch pipe 5d, the water heating heat exchanger 5 for heating water, a water heating pipe 5b for feeding heated water, a bypass pipe 5a for bypassing the water heating heat exchanger 5, a water mixing valve 31 for controlling a temperature of the hot water, and a diverter valve 33 for diverting water channels.

The water heating heat exchanger 5 is provided at a lower portion in the storage tank 3. The tank temperature sensor 14 is provided at a position in the vicinity of a bottom the storage tank where the temperature can be detected. The tank temperature sensor 13 is provided at a position in the vicinity of the water heating heat exchanger 5 (concretely, at a position which is slightly higher than an upper end of the water heating heat exchanger 5). The tank temperature sensor 10 is provided at a position in the vicinity of an upper end of the storage tank 3 where the temperature can be detected.

A hot water tap 9 is connected to the storage tank unit 1, and is opened and closed at the time of hot water supplying.

When the hot water tap 9 is opened, a part of the water is fed from the water pipe 5e to the storage tank 3, and the high-temperature water in the storage tank 3 is pushed out toward the hot water supply pipe 3a. Other water is led to the branch pipe 5d.

Here, when the temperature detected by the tank temperature sensor 13 is lower than a predetermined temperature (for example, 30 degrees), the warm water is not used, the diverter valve 33 is a-c opened, the water is led to the water mixing valve 31 via the bypass pipe 5a and a water supply pipe 5c, and the water is mixed with the high-temperature water from the hot water supply pipe 3a so as to be supplied.

The water mixing valve 31 is controlled so that the temperature detected by a hot water supply temperature sensor 17 provided at a hot water supply pipe 9a becomes a hot water supply temperature which is set by a remote control 6.

When the temperature of the tank temperature sensor 13 is higher than a predetermined temperature (for example, 30 degrees), the warm water is used, the diverter valve 33 is b-c opened, the water is heated by the water heating heat exchanger 5 and is led to the water mixing valve 31 via the water heating pipe 5b and the water supply pipe 5c, and the water is mixed with the high-temperature water from the hot water supply pipe 3a so as to be supplied.

As described above, when heat of the water whose temperature is lower than that of the warm water in the storage tank 3 is exchanged with heat of the warm water in the storage tank 3, the heat of the warm water can be used for hot water supplying. Since heat is removed from the warm water in the storage tank 3, the energy efficiency at the time of re-boiling can be improved.

The water mixing valve 31 is controlled so that a hot water supply temperature sensor 17 provided at the hot water supply pipe 9a is set to the hot water supply temperature which is set by the remote control 6. Since the temperature of the water is high in the water mixing valve 31, the consumption of the hot water (the high-temperature water from the hot water supply pipe 3a) can be reduced. Therefore, the heat quantity of the stored hot water can be kept.

In addition, in the hot water supply system of the first embodiment, a fall in temperature of the warm water in the tank is mainly caused by heat radiation.

<Second Embodiment>

Next, a second embodiment of the hot water supply system of the present invention will be explained.

Figure 2:
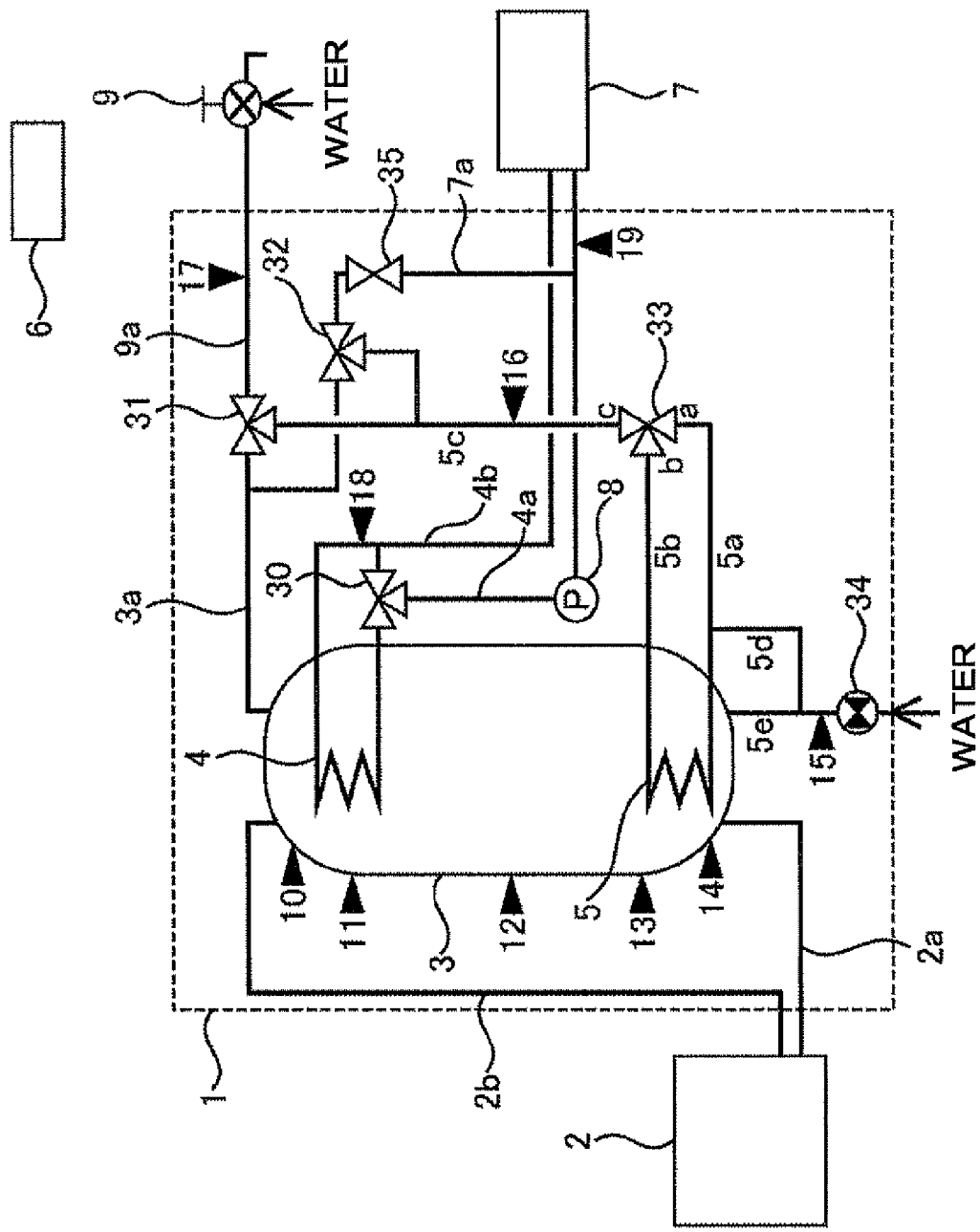
FIG. 2 is a schematic diagram of a hot water supply system according to a second embodiment of the present invention.

As shown in FIG. 2, the hot water supply system of the second embodiment is provided with the storage tank unit 1 of the first embodiment connected to a bathtub 7, a water running pipe 7a for running water into the bathtub 7, a bathtub mixing valve 32 for controlling the temperature of the running water, a water running valve 35 for controlling start and stop of the running water, a reheating heat exchanger 4 for reheating hot and cold water in the bathtub 7, a circulating pump 8 for circulating hot and cold water in the bathtub 7 and the reheating heat exchanger 4, a supply pipe 4a for leading the hot and cold water from the bathtub 7 to the reheating heat exchanger 4, a circulation adjusting valve 30 for controlling a temperature of the reheated hot water, and a return pipe 4b for returning the reheated hot water to the bathtub 7.

When the water running valve 35 is opened, a part of the water is fed from the water pipe 5e to the storage tank 3, and the high-temperature water in the storage tank 3 is pushed out toward the hot water supply pipe 3a. Other water is led to the branch pipe 5d.

Here, when the temperature detected by the tank temperature sensor 13 is lower than a predetermined temperature (for example, 30 degrees), the warm water in the storage tank 3 is not used, the diverter valve 33 is a-c opened, the water is led to the bathtub mixing valve 32 via the bypass pipe 5a and the water supply pipe 5c, and the water is mixed with the high-temperature water from the hot water supply pipe 3a so as to be run.

The bathtub mixing valve 32 is controlled so that a bathtub temperature sensor 19 provided at the supply pipe 4a is set to a temperature set which is by the remote control 6.

When the temperature of the tank temperature sensor 13 is higher than a predetermined temperature (for example, 30 degrees), the warm water in the storage tank 3 is used, the diverter valve 33 is b-c opened, the water is heated by the water heating heat exchanger 5 and is led to the bathtub mixing valve 32 via the water heating pipe 5b and the water supply pipe 5c, and the water is mixed with the high-temperature water from the hot water supply pipe 3a so as to be run. When heat of the water whose temperature is relatively low compared to that of the warm water in the storage tank 3 is exchanged with heat of the warm water in the storage tank 3, the heat of the warm water can be used for hot water supplying. Since heat is removed from the warm water in the storage tank 3, the energy efficiency at the time of re-boiling can be improved.

The bathtub mixing valve 32 is controlled so that the bathtub temperature sensor 19 provided at the supply pipe 4a is set to a temperature set which is by the remote control 6. Since the temperature of the water is high in the bathtub mixing valve 32, the consumption of the hot water (the high-temperature water from the hot water supply pipe 3a) can be reduced. Therefore, the heat quantity of the stored hot water can be kept.

The reheating heat exchanger 4 is provided at an upper portion in the storage tank 3. At the time of reheating, a circulating pump 8 is periodically operated, the hot and cold water in the bathtub 7 is led to the supply pipe 4a. If the temperature detected by the bathtub temperature sensor 19 is lower than a bathtub temperature set which is by the remote control 6, operation of the circulating pump 8 is continued, the hot and cold water in the bathtub 7 is led to the reheating heat exchanger 4 so as to exchange heat with the high-temperature water in the storage tank. Since the temperature after heat-exchange is high, the temperature of the hot water flowing through the return pipe 4b is adjusted by the circulation adjusting valve 30 based on temperatures detected by the reheating temperature sensor 18 and the bathtub temperature sensor 19, and the hot water is turned to the bathtub 7. In this manner, reheating can be performed.

Since the water in the bathtub is reheated to 40 degrees Celsius or thereabouts, the temperature of the warm water (commonly referred to as "middle-temperature water") whose heat is used for reheating becomes 40 degrees or thereabouts. Considering that common hot water supply temperature is, for example, 40 degrees Celsius or so, the middle-temperature water is not suitable for hot water supplying. Therefore, the middle-temperature water is preferably used for pre-heating.

In addition, in the hot water supply system of the second embodiment, the middle-temperature water is mainly obtained by reheating, and a fall in temperature of the warm water in the tank is caused by heat radiation.

In the first and second embodiments, the diverter valve 33 may be replaced by a mixing valve (a mixing valve for heating water) which can adjust a mixing ratio.

<Third Embodiment>

Next, a third embodiment of the hot water supply system of the present invention will be explained.

Figure 3:
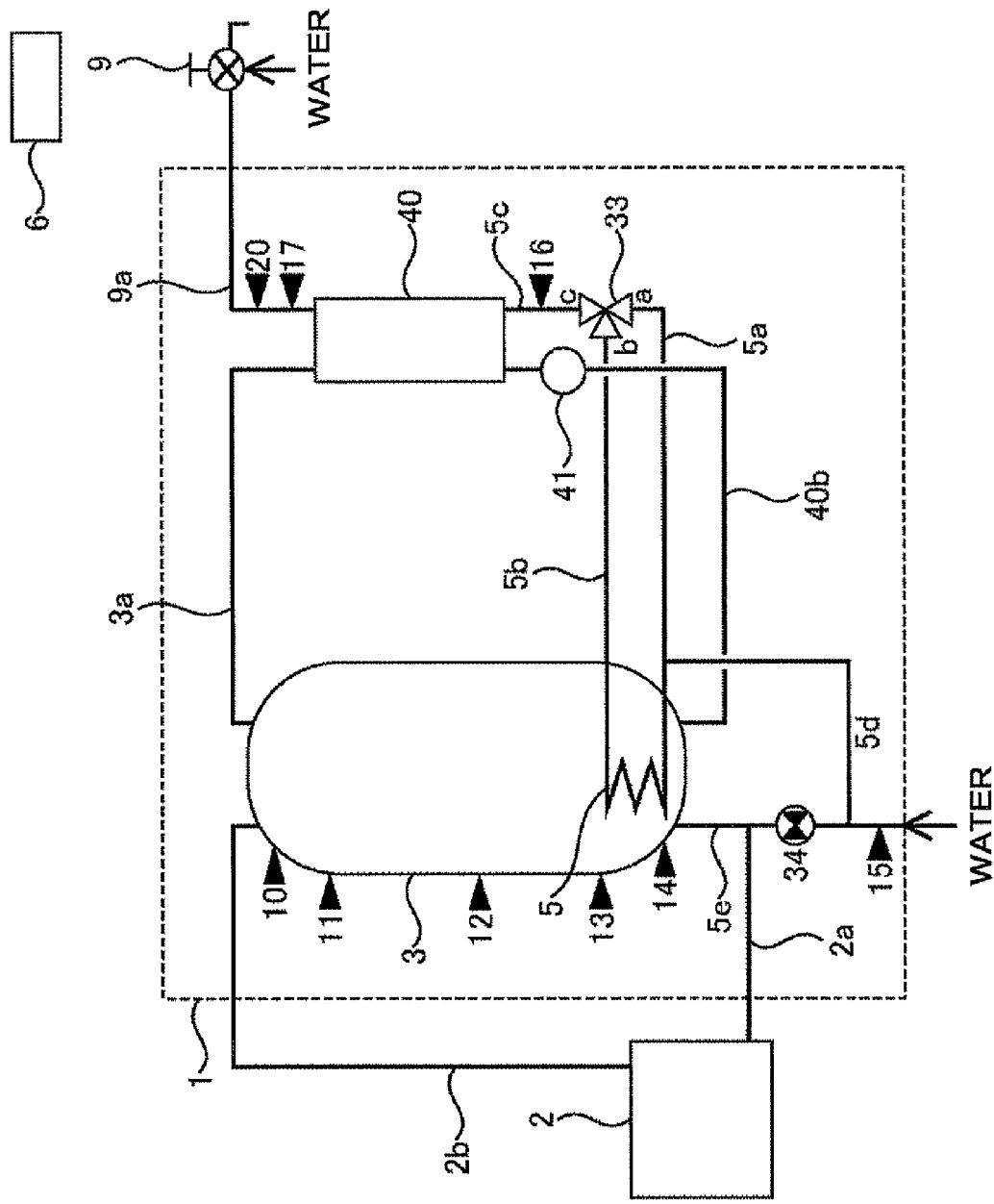
FIG. 3 is a schematic diagram of a hot water supply system according to a third embodiment of the present invention.

Generally, as shown in FIG. 3, the hot water supply system of the third embodiment is provided with a storage tank unit 1 having a storage tank 3 for storing hot and cold water, and a heat pump unit 2 which serves as a heating means for heating the hot and cold water in the storage tank 3.

The storage tank unit 1 is provided with the storage tank 3, tank temperature sensors 10, 11, 12, 13, 14 for detecting temperatures in the storage tank 3, and a heat pump supply pipe 2a and a heat pump return pipe 2b (a circulation circuit) to and from the heat pump unit 2.

The heat pump unit 2 is provided with a heat pump cycle composed of a compressor, a condenser, an expansion valve, an evaporator, and a hot and cold water circulating pump (not shown), etc.

The hot and cold water at the lower portion in the storage tank 3 is fed from the heat pump supply pipe 2a to the heat pump unit 2 so as to be boiled. Next, the high-temperature water is returned from the heat pump return pipe 2b to an upper portion in the storage tank 3 so as to be stored.

The storage tank unit 1 is provided with a water pipe 5e for leading water to the storage tank 3, a hot water supply pipe 3a for feeding high-temperature hot water from the storage tank 3, a branch pipe 5d, the water heating heat exchanger 5 for heating water, a water heating pipe 5b for feeding heated water, a bypass pipe 5a for bypassing the water heating heat exchanger 5, a diverter valve 33 for diverting water channels, a water-heating heat exchanger 40 for exchanging heat between the high-temperature hot water in the storage tank 3 and supplied water, and a hot water circulating pump 41 for circulating hot water in the water-heating heat exchanger 40 and the storage tank 3.

The water heating heat exchanger 5 is provided at a lower portion in the storage tank 3. The tank temperature sensor 14 is provided at a position in the vicinity of a bottom the storage tank where the temperature can be detected. The tank temperature sensor 13 is provided at a position in the vicinity of the water heating heat exchanger 5 (concretely, at a position which is slightly higher than an upper end of the water heating heat exchanger 5). The tank temperature sensor 10 is provided at a position in the vicinity of an upper end of the storage tank 3 where the temperature can be detected.

A hot water tap 9 is connected to the storage tank unit 1, and is opened and closed at the time of hot water supplying.

When the hot water tap 9 is opened, the hot water circulating pump 41 is controlled by the tank temperature sensor 10, a water temperature sensor 15 provided at upstream of the storage tank 3, a hot water flow rate sensor 20, and a water temperature sensor 16 provided at downstream of the storage tank 3 so that the hot water supply temperature becomes a temperature which is set by the remote control 6, the water-heating heat exchanger 40 exchanges heat between the high-temperature water in the storage tank 3 and low-temperature water, and hot water at a predetermined degree can be supplied.

In such a direct-pressure type hot water supply system, for reason of performance of the water-heating heat exchanger 40, a primary warm water whose heat is exchanged in the water-heating heat exchanger 40 is returned to the storage tank 3 at a temperature which is slightly higher (concretely, by 2 degrees) than that of the supplied water. Accordingly, since the warm water is returned to the lower portion in the tank without transmitting all heat to the supplied water, there arises a problem that a part of the high-temperature water at the upper portion in the tank is uselessly used. Also, especially in the heat pump hot water supply system, the lower the temperature of the liquid to be boiled, the higher the energy efficiency. For this reason, the energy efficiency can be improved according to the above configuration.

Here, when the temperature of the tank temperature sensor 13 is lower than a predetermined temperature (for example, 30 degrees), the warm water is not used, the diverter valve 33 is a-c opened, and the water is led to the water-heating heat exchanger 40 via the bypass pipe 5a and the water supply pipe 5c.

When the temperature of the tank temperature sensor 13 is higher than a predetermined temperature (for example, 30 degrees), the warm water is used, the diverter valve 33 is b-c opened, and the water is heated by the water heating heat exchanger 5 and is led to the water-heating heat exchanger 40 via the water heating pipe 5b and the water supply pipe 5c.

As described above, when heat of the water whose temperature is lower than that of the warm water in the storage tank 3 is exchanged with heat of the warm water in the storage tank 3, the heat of the warm water can be used for hot water supplying. Since heat is removed from the warm water in the storage tank 3, the energy efficiency at the time of re-boiling can be improved.

Also, since the temperature of the water led to the water-heating heat exchanger 40 becomes high, the number of revolutions of the hot water circulating pump 41 can be reduced. Therefore, a power consumption can be reduced.

Since the consumption of the high-temperature water from the hot water supply pipe 3a can be reduced, the heat quantity of the stored hot water can be kept.

As described above, in the hot water supply system of the third embodiment, the low-temperature water is mainly obtained by a direct-pressure type hot water supplying using the water-heating heat exchanger 40, and a fall in temperature of the warm water in the tank is caused by heat radiation.

<Fourth Embodiment>

Next, a fourth embodiment of the hot water supply system of the present invention will be explained.

Figure 4:
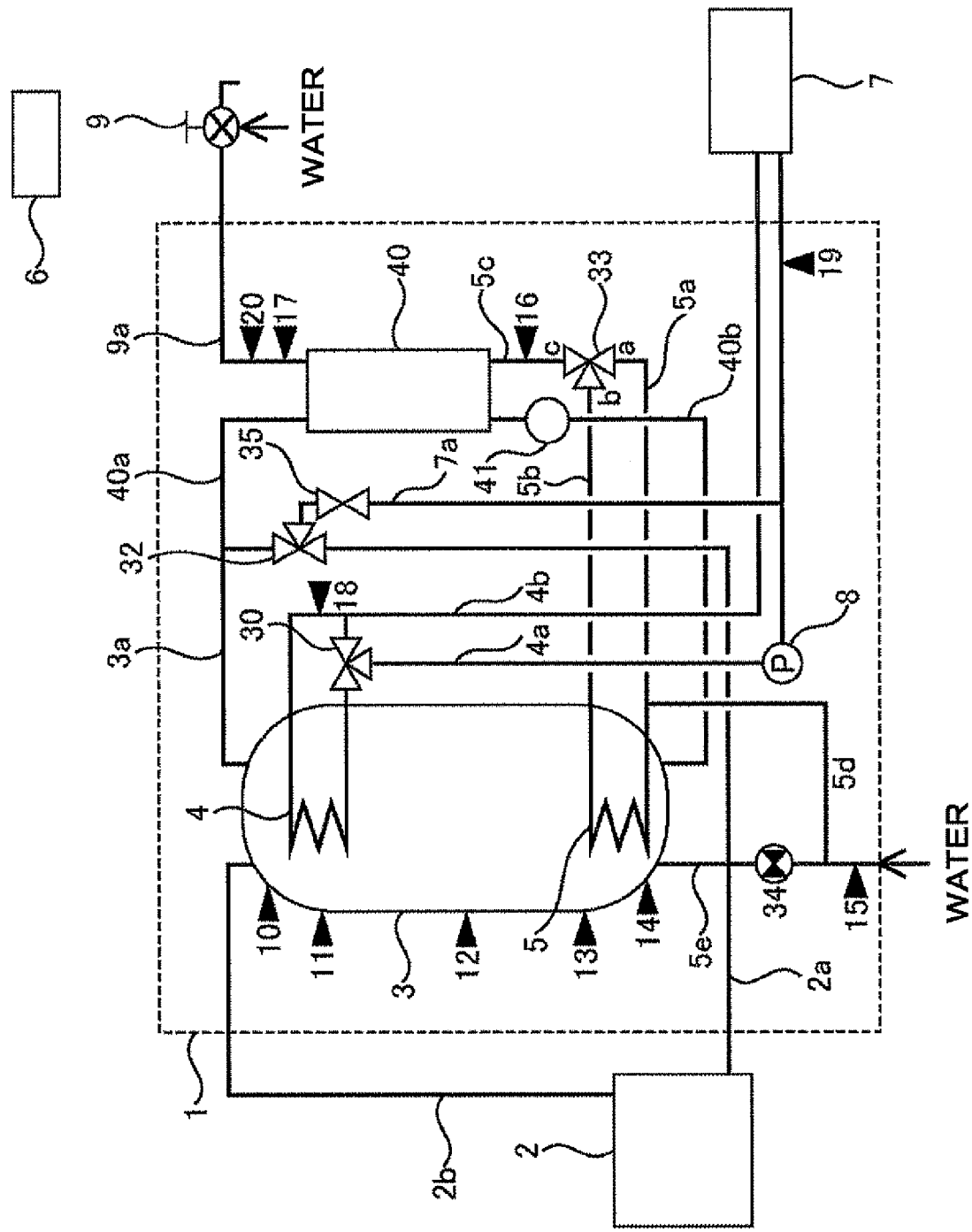
FIG. 4 is a schematic diagram of a hot water supply system according to a fourth embodiment of the present invention.

As shown in FIG. 4, hot water supply system of the fourth embodiment is provided with the storage tank unit 1 of the third embodiment connected to a bathtub 7, a water running pipe 7a for running water into the bathtub 7, a bathtub mixing valve 32 for controlling the temperature of the running water, a water running valve 35 for controlling start and stop of the running water, a reheating heat exchanger 4 for reheating hot and cold water in the bathtub 7, a circulating pump 8 for circulating hot and cold water in the bathtub 7 and the reheating heat exchanger 4, a supply pipe 4a for leading the hot and cold water from the bathtub 7 to the reheating heat exchanger 4, a circulation adjusting valve 30 for controlling a temperature of the reheated hot water, and a return pipe 4b for returning the reheated hot water to the bathtub 7.

When the water running valve 35 is opened, a part of the water is fed from the water pipe 5e to the storage tank 3, and the high-temperature water in the storage tank 3 is pushed out toward the hot water supply pipe 3a. Other water is led to the branch pipe 5d.

The bathtub mixing valve 32 is controlled so that a bathtub temperature sensor 19 provided at the supply pipe 4a is set to a temperature set which is by the remote control 6.

The reheating heat exchanger 4 is provided at an upper portion in the storage tank 3. At the time of reheating, a circulating pump 8 is periodically operated, the hot and cold water in the bathtub 7 is led to the supply pipe 4a. If the temperature detected by the bathtub temperature sensor 19 is lower than a bathtub temperature set which is by the remote control 6, operation of the circulating pump 8 is continued, the hot and cold water in the bathtub 7 is led to the reheating heat exchanger 4 so as to exchange heat with the high-temperature water in the storage tank. Since the temperature after heat-exchange is high, the temperature of the hot water flowing through the return pipe 4b is adjusted by the circulation adjusting valve 30 based on temperatures detected by the reheating temperature sensor 18 and the bathtub temperature sensor 19, and the hot water is turned to the bathtub 7. In this manner, reheating can be performed.

Here, when the temperature detected by the tank temperature sensor 13 is lower than a predetermined temperature (for example, 30 degrees), the warm water in the storage tank 3 is not used, the diverter valve 33 is a-c opened, the water is led to the bathtub mixing valve 32 via the bypass pipe 5a and the water supply pipe 5c, and the water is mixed with the high-temperature water from the hot water supply pipe 3a so as to be run.

The bathtub mixing valve 32 is controlled so that a bathtub temperature sensor 19 provided at the supply pipe 4a is set to a temperature set which is by the remote control 6.

When the temperature of the tank temperature sensor 13 is higher than a predetermined temperature (for example, 30 degrees), the warm water in the storage tank 3 is used, the diverter valve 33 is b-c opened, the water is heated by the water heating heat exchanger 5 and is led to the bathtub mixing valve 32 via the water heating pipe 5b and the water supply pipe 5c, and the water is mixed with the high-temperature water from the hot water supply pipe 3a so as to be run.

As described above, when heat of the water whose temperature is relatively low compared to that of the warm water in the storage tank 3 is exchanged with heat of the warm water in the storage tank 3, the heat of the warm water can be used for hot water supplying. Since heat is removed from the warm water in the storage tank 3, the energy efficiency at the time of re-boiling can be improved.

The bathtub mixing valve 32 is controlled so that the bathtub temperature sensor 19 provided at the supply pipe 4a is set to a temperature set which is by the remote control 6. Since the temperature of the water is high in the bathtub mixing valve 32, the consumption of the hot water (the high-temperature water from the hot water supply pipe 3a) can be reduced. Therefore, the heat quantity of the stored hot water can be kept.

Since the water in the bathtub is reheated to 40 degrees or thereabouts, the temperature of the warm water (commonly referred to as "middle-temperature water") whose heat is used for reheating becomes 40 degrees or thereabouts. The middle-temperature water is not suitable for hot water supplying. Therefore, the middle-temperature water is preferably used for pre-heating.

In addition, in the hot water supply system of the fourth embodiment, the middle-temperature or low-temperature water is mainly obtained by a direct-pressure type hot water supplying using the water-heating heat exchanger 40, and a fall in temperature of the warm water in the tank is caused by heat radiation.

<Fifth Embodiment>

Next, a fifth embodiment of the hot water supply system of the present invention will be explained. In the fifth embodiment, a water running circuit is provided with the water heating heat exchanger.

<Sixth Embodiment>

Next, a sixth embodiment of the hot water supply system of the present invention will be explained. In the sixth embodiment, both of the common hot water supply circuit and the water running circuit are provided with the water heating heat exchangers.

Figure 5:
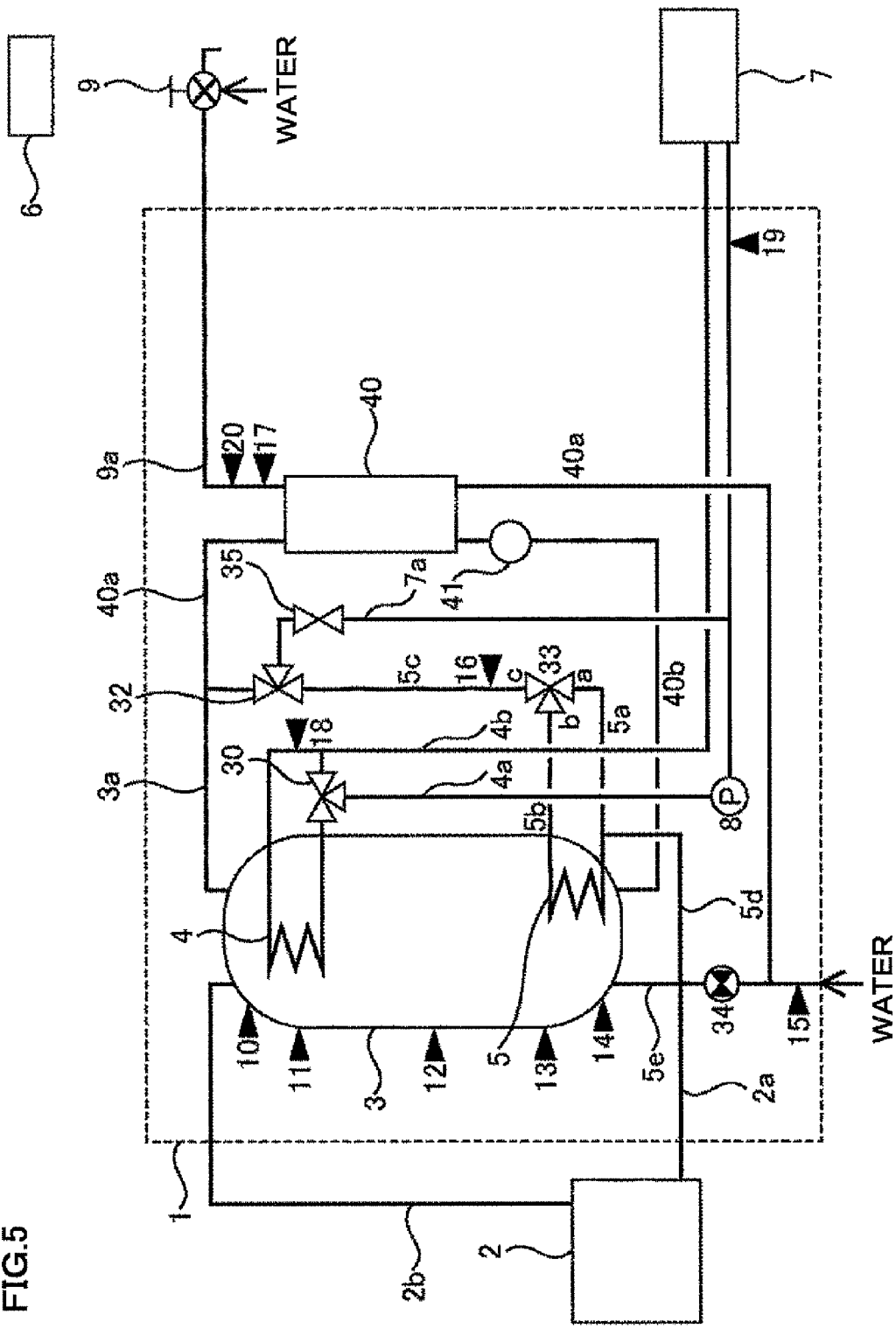
FIG. 5 is a schematic diagram of a hot water supply system according to a fifth embodiment of the present invention.
Figure 6:
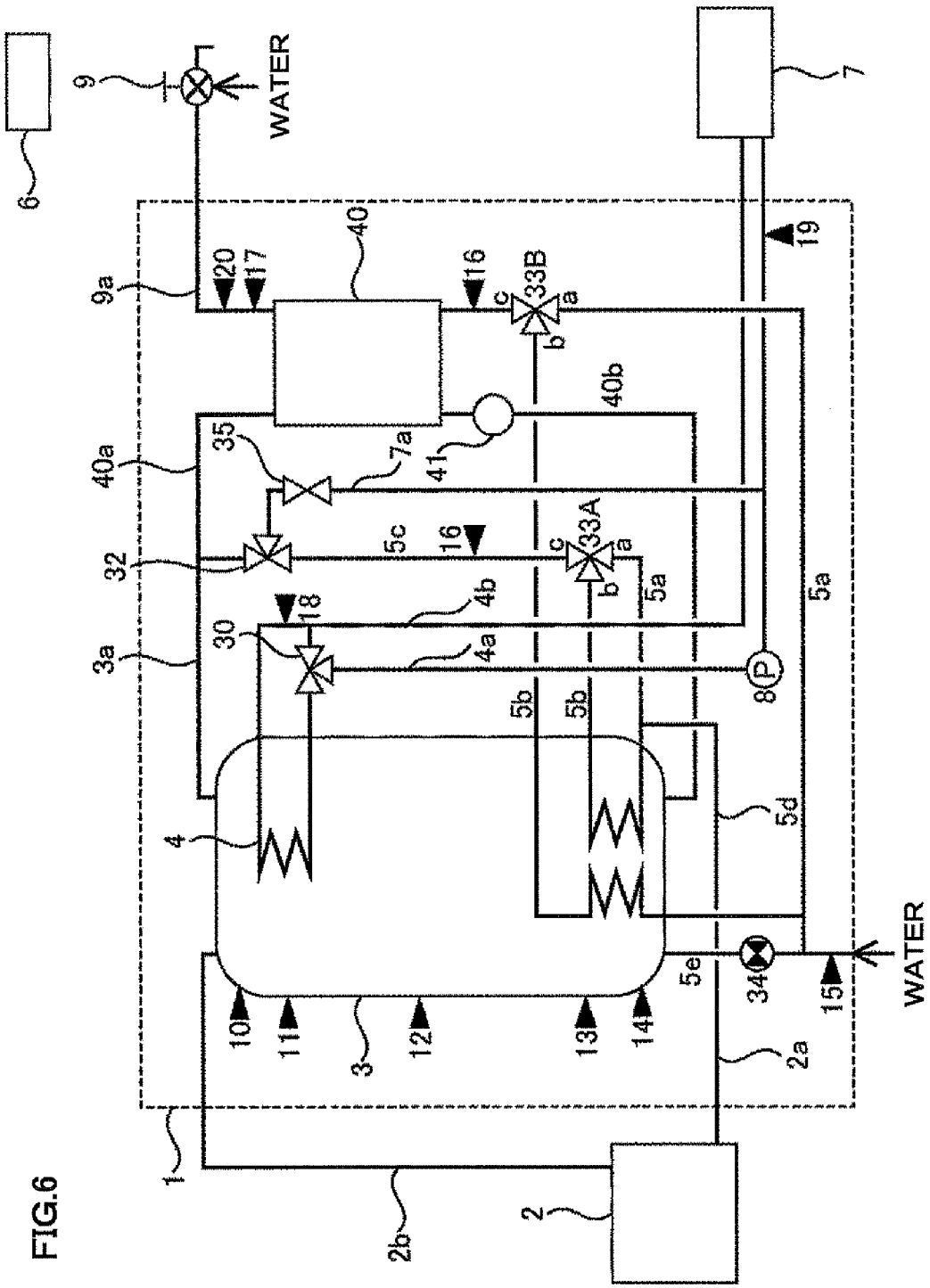
FIG. 6 is a schematic diagram of a hot water supply system according to a sixth embodiment of the present invention.

According to the fourth embodiment shown in FIG. 4, the fifth embodiment shown in FIG. 5, and the sixth embodiment shown in FIG. 6, in any embodiment including different common hot water supply circuit and bathtub hot water supply circuit, the hot water supply system, which can improve the energy efficiency at the time of re-boiling by using heat of the warm water and the middle-temperature water at the lower portion in the storage tank, can be provided.

In addition, the hot water supply system according to the present invention is not limited to the above embodiments, and various changes and modifications can be made without departing from the scope of the invention defined by the appended claims.

For example, in the present invention, diverter valves 33 (33A, 33B) may be replaced by mixing valves (mixing valves for heating water) which can adjust mixing ratios.

By this replacement, when temperatures detected by the tank temperature sensors 13 and 14 are high (for example, above 60 degrees) (e.g., immediately after boiling), one of the mixing valves 33 takes in water heated in the water heating heat exchanger 5 from the water heating pipe 5b, other mixing valve 33 takes in water as it is from the bypass pipe 5a, a set temperature of the water temperature sensor 16 is determined with reference to the temperature detected by the tank temperature sensor 10 so that the hot water supply temperature is close to the temperature which is set by the remote control 6, and the mixing valve 33 is controlled so that the temperature detected by a hot water supply temperature sensor 17 provided at a hot water supply pipe 9a becomes the predetermined temperature of the water temperature sensor 16. In this manner, the heat of the liquid present at the lower portion in the storage tank 3 can be used effectively.

Also, in the present invention, the bypass pipe 5a and the diverter valve 33 can be omitted. If the bypass pipe 5a and the diverter valve 33 are omitted, a low-cost hot water supply system which uses the heat of the warm water obtained during operation and can improve the energy efficiency at the time of re-boiling is provided.

Figure 7:
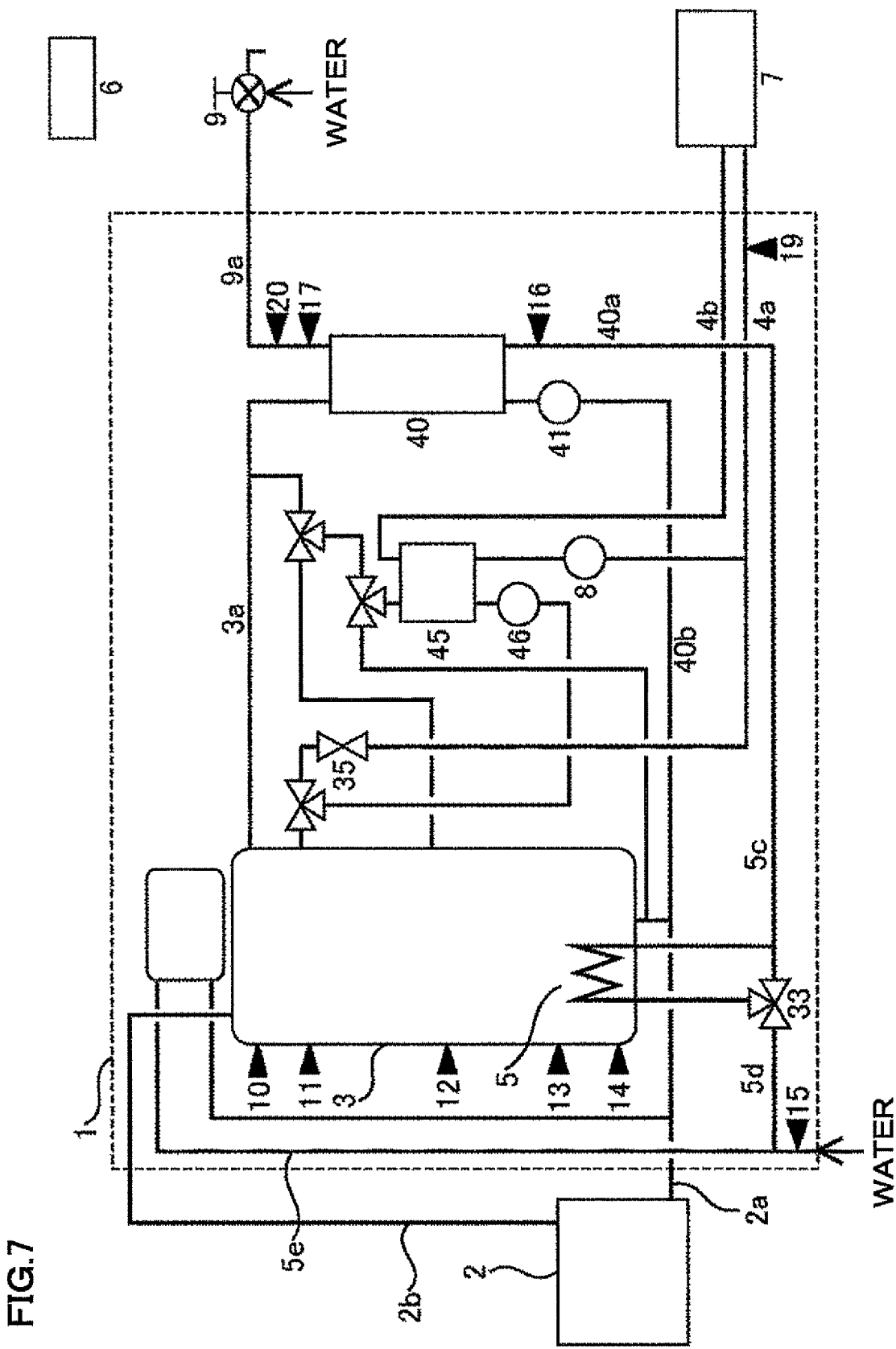
FIG. 7 is a schematic diagram of a hot water supply system according to a seventh embodiment of the present invention.

Also, the storage tank 3 may be either closed-type and open-type. An embodiment of the open-type storage tank is shown in FIG. 7. In this hot water supply system, a reheating heat exchanger 45 is external to the storage tank.

In this configuration, a hot water supply system which uses the heat of the warm water and the middle-temperature water present at the lower portion in the tank and can improve the energy efficiency at the time of re-boiling.

Although the heating means for heating the hot and cold water in the storage tank is the heat pump unit 2 in the above embodiment, the present invention is not limited to the above described embodiment. The heating means may be an electric heater.

Further, when the hot water supply system according to the present invention is a heat pump hot water supply system, the heating means and the tank do not need to be separate units such as the heat pump unit 2 and the storage tank unit 1. They may be integrated into a single unit.

Also, other than the conventional hot water supply system which directly the uses high-temperature water for hot water supplying, the present invention can provide a hot water supply system which indirectly uses the high-temperature water as a heating medium for heating water, and a hot water supply system which uses the brine, etc. (not the high-temperature water) as the heating medium for heating water. The present invention can be applied to any hot water supply system which uses a high-temperature liquid stored in a tank for hot water supplying.

Also, for example, the low-temperature water can be obtained when the high-temperature water is used for heating in a hot-water heating apparatus for floor heating in addition to the time when reheating, direct-pressure type hot water supplying using the water-heating heat exchanger, or heat radiation are performed.

Also, although the diverter valve 33 is diverted at the temperature of 30 degrees, the present invention is not limited to the temperature. The diverter valve 33 may be diverted at any temperature.

EXPLANATION OF REFERENCES

1: storage tank unit
2: heat pump unit
3: storage tank
4: reheating heat exchanger
5: water heating heat exchanger
5a: bypass pipe
5b: water heating pipe
7: bathtub
9: hot water tap
10, 13: tank temperature sensor
16: water temperature sensor
31: water mixing valve
32: bathtub mixing valve
33: diverter valve (mixing valve for heating water)
34: pressure reducing valve
40: water-heating heat exchanger

The invention claimed is:

1. A hot water supply system, comprising:
a tank configured to store water as a high-temperature liquid, the tank comprising an upper portion and a lower portion; and
a heat pump configured to heat the liquid stored in the tank to high-temperature;
a circulation circuit comprising:
a heat pimp supply pipe providing the heat pump with water from the lower portion of the tank; and
a heat pump return pipe providing the upper portion of the tank with water heated by the heat pump;
a heat exchanger configured to heat water by the liquid present in the lower portion of the tank, the heat exchanger provided at the lower portion in the tank;
a hot water supply terminal; and
a mixing valve connected to the tank, the heat exchanger and the hot water supply terminal, the mixing valve configured to allow water received from the heat exchanger to enter the hot water supply terminal, and the mixing valve configured to control the passage of water from the tank to the hot water supply terminal.

2. The hot water supply system according to claim 1, further comprising:
a hot water supply circuit comprising:
a water heating path passing through the heat exchanger and leading to the hot water supply terminal; and
a bypass path bypassing the heat exchanger and leading to the hot water supply terminal; and
a hot water supply circuit control mechanism which controls a circulating condition of the water supplied to the water heating path and the bypass path.

3. The hot water supply system according to claim 2, wherein the hot water supply circuit control mechanism switches between a condition in which the water flows through the water heating path and a condition in which the water flows through the bypass path.

4. The hot water supply system according to claim 2, wherein the hot water supply circuit control mechanism adjusts a flow rate ratio of the water flowing through the water heating path to the water flowing through the bypass path.

5. A hot water supply system comprising:
a tank configured to store water as a high-temperature liquid, the tank comprising an upper portion and a lower portion;
a heat pump configured to heat the liquid stored in the tank to high-temperature; and
a circulation circuit comprising:
a heat pump supply pipe providing the heat pump with water from the lower portion of the tank; and
a heat pump return pipe providing the upper portion of the tank with water heated by the heat pump;
a heat exchanger configured to heat water by the liquid present in the lower portion of the tank, the heat exchanger provided at the lower portion of the tank;
a hot water supply terminal;
a hot water supply circuit comprising:
a water heating path passing through the heat exchanger and leading to the hot water supply terminal; and
a bypass path bypassing the heat exchanger and leading to the hot water supply terminal;
a temperature sensor configured to detect the temperature of the liquid in the tank in the vicinity of the heat exchanger; and
a hot water supply circuit control mechanism which controls a circulating condition of the water supplied to the water heating path and the bypass path based on the temperature of the liquid in the vicinity of the heat exchanger detected by the temperature sensor.

6. A hot water supply system, comprising:
a tank for configured to store a high-temperature liquid, the tank comprising an upper portion and a lower portion;
a heating means for heating the liquid stored in the tank to high-temperature;
a heat exchanger configured to heat water by the liquid present in the lower portion in the tank, the heat exchanger provided at the lower portion of the tank;
a hot water supply terminal;
a hot water supply circuit comprising:
a water heating path passing through the heat exchanger and leading to the hot water supply terminal; and
a bypass path bypassing the heat exchanger and leading to the hot water supply terminal;
a temperature sensor configured to detect the temperature of the liquid in the tank in the vicinity of the heat exchanger; and
a hot water supply circuit control mechanism which controls a circulating condition of the water supplied to the water heating path and the bypass path
based on the temperature of the liquid in the vicinity of the heat exchanger detected by the temperature sensor.

7. The hot water supply system according to claim 6, wherein the hot water supply circuit control mechanism switches between a condition in which the water flows through the water heating path and a condition in which the water flows through the bypass path.

8. The hot water supply system according to claim 6, wherein the hot water supply circuit control mechanism adjusts a flow rate ratio of the water flowing through the water heating path to the water flowing through the bypass path.

* * * * *